United States Patent Office 2,696,509
Patented Dec. 7, 1954

2,696,509

PRODUCTION OF BENZENE HEXACHLORIDE

William A. La Lande, Jr., Upper Darby, Gladys Molyneux, Meadowbrook, and Margaretta E. Aeugle, Philadelphia, Pa., assignors to The Pennsylvania Salt Manufacturing Company, Philadelphia, Pa., a corporation of Pennsylvania No Drawing. Application September 6, 1946,
Serial No. 695,276

1 Claim. (Cl. 260—648)

This invention relates to a new process for producing benzene hexachloride products unusually rich in the "gamma" isomeric form of this compound, and the products thus produced.

Benzene hexachloride (this term is used throughout the specification and claim to indicate any one of the isomeric forms of 1,2,3,4,5,6-hexachlorocyclohexane, as well as mixtures of the isomers of this compound) is made by addition of three molecules of chlorine to one of benzene. The resulting compound contains one chlorine atom on each carbon atom of the benzene. The benzene hexachloride product that is formed when chlorine is reacted with benzene has long been considered to be a mixture of stereoisomeric forms, the so called "alpha," "beta," "gamma," and "delta" forms having been recognized; these are stated to be present in the approximately fixed proportion of 70% of the alpha isomer, 5% of the beta isomer, 10 to 12% of the gamma isomer, and 13 to 15% of the delta isomer.

It is known in the art that this customary mixture of the benzene hexachloride isomers has insecticidal value, but that it is in only one of the isomeric forms of benzene hexachloride, namely the gamma form, that substantially all this insecticidal value resides. Even though benzene hexachloride is greatly diluted when it is compounded into insecticides, the presence of large amounts of insecticidally inactive organic materials such as the alpha and beta isomers is considered undesirable by the compounder of insecticides. Ideally, therefore, a benzene hexachloride product for compounding into insecticides should consist solely or largely of the gamma isomer.

However, it has not heretofore been commercially feasible to produce a benzene hexachloride material for insecticidal purposes containing appreciably more than the "natural" proportion of 10 to 12% gamma isomer, since the separation of even a gamma-rich product from the natural mixture of four isomers has involved the tedious and costly steps of successive resolutions and crystallizations, whereby a gamma-rich product may eventually be obtained as one of the crystallization products.

We have now discovered a process for chlorination of benzene and the recovery of the benzene hexachloride formed, whereby a gamma-rich benzene hexachloride product may be obtained from the synthesis reaction mixture. Our process involves the successive steps of (a) chlorinating benzene in a benzene-containing liquid, i. e. liquid benzene in a suitable solvent such as glacial acetic acid or carbon tetrachloride, while exposing to actinic light, whereby benzene is converted to benzene hexachloride, (b) discontinuing such chlorination when the total quantity of benzene converted to benzene hexachloride amounts to from about 10% to 60%, preferably from about 25% to 50%, of the total quantity of liquid reaction mixture, (c) separating the solid phase material which has formed, and (d) separately recovering, without further chlorination, benzene hexachloride product of reaction that remains in solution in the liquid phase material separated in the preceding step. We have found it desirable to correlate the temperature of the separation step (c) with the extent of chlorination; thus when chlorination does not go beyond the preferred limit of about 50% of the total reaction mixture, the separation step (c) is carried out at a temperature not higher than about 40° C., whereas when the extent of chlorination goes beyond about 50%, the separation step (c) is preferably carried out at a somewhat warmer temperature, say 40 to 80° C., and when the extent of chlorination does not exceed about 40%, the separation step may advantageously be carried out at about 25° C. Although it is convenient to use chlorine in gaseous form in our process, other forms, e. g., liquid chlorine, may be used.

We have found that by following the steps above outlined, the benzene hexachloride product obtained in step (d) above exhibits from 3 to 7 times the insecticidal efficacy of the products which have heretofore been recovered directly from the chlorination reaction mixture. For example, the gamma isomer concentration in the product prepared according to our invention is usually at least 20 to 30%, and may be as high as 90% or more, whereas the gamma isomer concentration in products prepared by comparable prior art processes is usually in the range of 10 to 12%. We have further found that our gamma isomer rich benzene hexachloride product is substantially free from higher chlorinated products, such as the heptachloro derivative of benzene, which might have a deleterious effect on the compounding of our product for the various applications hereinafter described.

In a preferred method of carrying out the process of our invention, gaseous chlorine is led into a solution of benzene in a solvent such as glacial acetic acid, carbon tetrachloride, chloroform, or other organic liquid solvent for benzene substantially inert under the conditions of use; when a solution is employed it preferably contains only a minor proportion by volume of benzene. The chlorination is carried out in the presence of actinic irradiation, e. g. the irradiation emitted by an ultraviolet lamp, bright sunlight, or other source of actinic light. The introduction of chlorine is preferably carried out with cooling if necessary to maintain the mixture below about 40° to 50° C. It is important that the chlorination step be carried out in the absence of metal catalysts which produce substitution reactions, since such products are undesired impurities and decrease the yield of benzene hexachloride. Under these conditions benzene hexachloride is substantially the only chlorination product formed from the benzene. Chlorination is discontinued before the quantity of benzene chlorinated amounts to more than about one-half of the total liquid reaction mixture, on a liquid volume basis. In the case of a liquid reaction mixture consisting of a solution containing no more than a minor proportion by volume of benzene, the benzene present may of course be completely chlorinated to benzene hexachloride without departing from this limitation on the extent of chlorination.

Agitation of the reaction mixture is preferably maintained during chlorination and, after chlorination has been discontinued, the mixture is preferably further agitated and treated to eliminate unreacted chlorine. The chlorine-free reaction mixture is then cooled and maintained at a temperature not higher than about 40° C., preferably at room temperature or slightly below, while the solid phase which is formed is separated, e. g. by filtration. The separated solid represents the part of the benzene hexachloride product of chlorination that is richer in alpha and beta isomers than the whole product normally formed upon chlorination. Under the conditions described, from 50 to 75% of the whole benzene hexachloride reaction product may thus precipitate as alpha and beta concentrate.

The solution remaining after removal of the solid alpha and beta isomers contains dissolved therein substantially all of the gamma isomer formed during chlorination. This solution is now treated to recover this product, hereinafter referred to as "gamma-rich remainder product." When the starting material is a solution of benzene in a volatile solvent such as carbon tetrachloride, the gamma-rich remainder product may likewise be recovered by evaporation of the volatile solvent and any unreacted benzene. When the starting material is a solution of benzene in glacial acetic acid, the gamma-rich remainder product may advantageously be recovered by washing consecutively with water and with an alkaline wash to leach out acetic acid and eliminate any residue of acid.

The gamma-rich remainder product thus recovered is then preferably further processed to obtain it in a more desirable form. This may be done by chilling, preferably at a temperature of 0° to 5° C., to crystallize it at least in part. The crystallized gamma concentrate may then be separated from the residual oil (if there is any), e. g. by centrifuging. If a water or alkaline wash has been employed these products may be dried, the solid (hereinafter called "solid gamma concentrate") by air drying and the liquid (hereinafter called "residual oil") by a solid dehydrating agent such as calcium sulfate.

All of the above products, i. e. the gamma-rich remainder product, as well as the solid gamma concentrate and residual oil, when such is obtained, are new compositions of important insecticidal value. Each of these products is a mixture of two or more benzene hexachloride isomers which may also contain by-products of the benzene chlorination process, in small amount.

The gamma-rich remainder product which, upon chilling and standing separates into two phases, solid gamma concentrate and residual oil, may itself be looked upon as an end product, as above suggested, since it may be employed directly in insecticide formulation. This product may be characterized by the following properties:

Content of all benzene hexachloride isomers, at least 85%.
From 25 to 75% crystallizes upon holding for at least 12 hours below about 5° C.
Percent insecticidal effectiveness, as compared to pure gamma isomer 20 to 90%. More usually 25 to 60%.

The above-described solid gamma concentrate of our invention is characterized by the following properties:

Content of all benzene hexachloride isomers, at least 85%.
Melting range may be from 35 to 110° C.
Melting range usually from 48 to 80° C.
Percent insecticidal effectiveness, as compared to pure gamma isomer 20 to 90%. More usually 30 to 60%.

The residual oil of our invention is characterized by the following properties:

Content of all benzene hexachloride isomers, at least 70%.
Boiling range at 3 mm. Hg 90% over within 120 to 160° C.
Percent insecticidal effectiveness, as compared to pure gamma isomer, 20 to 90%. More usually 25 to 50%.

Any of the above products, when solid, may be compounded into dusts, sprays, emulsions, and other insecticidal compositions in the usual manner, e. g. may be compounded into an insecticidal dust by milling together in desired proportions a mixture of a small amount of the crystal product, or a concentrated solution thereof in acetone, and a carrier such as finely divided pyrophyllite, or a finely divided clay; may be made into a spray by dissolving a small amount of the crystal product in a solvent such as xylene, toluene, or a methyl naphthalene; or may be made into an emulsion by dispersing a concentrated xylene solution of the crystal product in water with a suitable emulsifying agent such as an alkylphenoxy polyethoxy ethanol.

Any of the above products, when liquid, may also be compounded into all the customary types of insecticidal compositions. Thus, the liquid may be adsorbed on or absorbed in a comminuted solid carrier material such as pyrophyllite, or a clay, with milling, in suitably small proportions for insecticidal purposes, and the resulting product is an essentially dry, free-flowing powder. To form sprays or emulsions the liquid may, of course be dissolved in a solvent such as xylene or toluene just as the crystalline material.

The following example is illustrative of the process of our invention:

*Example*

375 parts by weight of benzene and 1740 parts by weight of glacial acetic acid (by volume the ratio of benzene to acetic acid is about 1 to 4) were charged into a reaction vessel fitted with stirrer, reflux condenser, chlorine inlet, and mercury vapor lamp for supplying actinic light to the mixture. Chlorine gas was passed in with stirring and with cooling to maintain the temperature below 35° C. After about twelve hours, the requisite amount of chlorine for chlorination of all the benzene present to benzene hexachloride had been passed in. It was found desirable to use an amount of chlorine somewhat in excess of the amount theoretically required in order to ensure complete chlorination. The supply of chlorine was turned off and the solution treated to eliminate excess chlorine. When the mixture had become chlorine free, as shown by the disappearance of yellow color, it was cooled to room temperature and filtered. The unwashed but dried filter cake, consisting of an alpha and beta isomer concentrate, amounted to 673 parts by weight.

The filtrate, amounting to 2070 parts by weight, specific gravity 1.165, and containing 50.6% acetic acid, and 49.4% water-immiscible liquid free from benzene, was mixed with twice its volume of water, the aqueous liquid was removed by decantation and treated separately for recovery of acetic acid. The water-immiscible liquid was again washed with water. Sodium bicarbonate was added to neutralize the residual acid and the washing process was repeated until neutralization and complete washing were effected. The resulting product, 687 parts by weight, was a mixture of $C_6H_6Cl_6$ isomers of 85% purity, and crystallized to the extent of 29% when held for 12 hours below 5° C.

The 687 parts of liquid was thus refrigerated at 0° C. to 5° C., until it had crystallized in part. This product was centrifuged to separate the crystal product from the residual oil. The crystal product was a white solid amounting to about 200 parts by weight, having a melting range 55 to 95° C., and 50 to 60% of the insecticidal effectiveness of pure gamma isomer. The yield of residual oil, amounting to about 487 parts by weight, was a mixture of benzene hexachloride isomers and possibly other substances of undetermined composition, 90% distilling between 125 to 155° C. at 3 mm. mercury pressure having almost as great an insecticidal value as the solid gamma concentrate, namely about 45% of the effectiveness of pure gamma isomer.

The percent insecticidal effectiveness of the above products, as compared to pure gamma isomer, was determined by parallel tests of the product, and pure gamma isomer, to obtain the relative percent kill of the common house fly under the following test conditions:

The material to be tested was dissolved in an appropriate quantity of acetone so that application of a regulated quantity to glass plates, on evaporation of the acetone, left a residue of the material equivalent to 10 mg./ft.$^2$. The treated plates were placed in screen cages stocked with flies and observation made every ½ hour until total mortality was achieved. Each test was carried out at least in duplicate, and checks were supplied by simultaneously testing with untreated plates.

Percent insecticidal effectiveness was obtained by dividing the time required to obtain 100% mortality with the products of our invention into the time required to obtain 100% mortality with the pure gamma isomer, the tests being performed under equivalent conditions.

Since many modifications are possible in the process and product of our invention as above described without departure from the scope of the invention, it is intended that the above description of our invention should be interpreted as illustrative, and the invention is not to be limited except as set forth in the claim which follows.

We claim:

A process for production of benzene hexachloride products rich in gamma isomer, that comprises dissolving benzene in glacial acetic acid to form a solution containing no more than a minor proportion by volume of benzene, reacting the benzene in said solution, with actinic light irradiation and agitation, with an amount of gaseous chlorine sufficient to convert substantially all the benzene to benzene hexachloride, maintaining the temperature below about 40° C., during at least the greater part of the chlorination step, removing solid phase material from the resulting chlorination reaction mixture while maintaining the temperature below about 40° C., removing acetic acid from the liquid phase material from the preceding step by leaching with water, chilling the residual water-immiscible material from the proceding step, to a temperature not higher than about 5° C., to bring about partial crystallization, and separating solid phase material thus precipitated from residual liquid phase material.

References Cited in the file of this patent

UNITED STATES PATENTS

| Number | Name | Date |
|--------|------|------|
| 554,974 | Baum | Feb. 18, 1896 |

(Other references on following page)

UNITED STATES PATENTS

| Number | Name | Date |
|---|---|---|
| 631,608 | Bally | Aug. 22, 1899 |
| 2,438,900 | Cooke et al. | Apr. 6, 1948 |
| 2,558,363 | Kolka et al. | June 26, 1951 |

FOREIGN PATENTS

| Number | Country | Date |
|---|---|---|
| 447,058 | Great Britain | May 7, 1936 |
| 481,515 | Great Britain | Mar. 11, 1938 |
| 471,941 | Belgium | Apr. 19, 1945 |
| 906,619 | France | May 22, 1945 |
| 460,288 | Belgium | Oct. 31, 1945 |
| 573,693 | Great Britain | Dec. 3, 1945 |

OTHER REFERENCES

Matthews, "Jour. Chem. Soc.," vol. 59, Transactions, pages 165-166 (1891).

Van Der Linden, "Ber. der deutsche Chem. Gesell.," vol. 45, pp. 231-36 (1912).